(12) United States Patent
Chen et al.

(10) Patent No.: US 12,409,521 B2
(45) Date of Patent: Sep. 9, 2025

(54) DOUBLE-SWING ANGLE SPINDLE HEAD

(71) Applicant: KEDE NUMERICAL CONTROL CO., LTD., Dalian (CN)

(72) Inventors: Hu Chen, Dalian (CN); Yanxing Hou, Dalian (CN); Hongtao Tang, Dalian (CN); Haibo Zhang, Dalian (CN); Tinghui Liu, Dalian (CN); Chuansi Zhang, Dalian (CN); Chunhong Fan, Dalian (CN)

(73) Assignee: KEDE NUMERICAL CONTROL CO., LTD., Dalian (CN)

( * ) Notice: Subject to any disclaimer, the term of this patent is extended or adjusted under 35 U.S.C. 154(b) by 466 days.

(21) Appl. No.: 17/796,992

(22) PCT Filed: Nov. 27, 2020

(86) PCT No.: PCT/CN2020/132125
§ 371 (c)(1),
(2) Date: Aug. 2, 2022

(87) PCT Pub. No.: WO2021/232732
PCT Pub. Date: Nov. 25, 2021

(65) Prior Publication Data
US 2023/0055529 A1 Feb. 23, 2023

(30) Foreign Application Priority Data
May 19, 2020 (CN) .......................... 202010426603.3

(51) Int. Cl.
*B23Q 1/70* (2006.01)
(52) U.S. Cl.
CPC ..... *B23Q 1/706* (2013.01); *Y10T 409/308512* (2015.01)

(58) Field of Classification Search
CPC ........ B23Q 1/5406; B23Q 1/706; B23Q 1/70; B23Q 5/42; Y10T 409/308512
See application file for complete search history.

(56) References Cited

U.S. PATENT DOCUMENTS

| | | | | |
|---|---|---|---|---|
| 2002/0085893 | A1* | 7/2002 | Geiger | B23Q 1/4861 409/168 |
| 2009/0123246 | A1* | 5/2009 | Matsui | B23Q 1/4852 409/201 |

FOREIGN PATENT DOCUMENTS

| | | |
|---|---|---|
| CN | 103659402 A | 3/2014 |
| CN | 104441080 A | 3/2015 |

(Continued)

*Primary Examiner* — Alan Snyder
(74) *Attorney, Agent, or Firm* — Muncy, Geissler, Olds & Lowe, P.C.

(57) ABSTRACT

The present invention discloses a double-swing angle spindle head, in which an A-axis swing shaft is connected to the spindle head through the flange on the end face to realize the swing of the A-axis, and a crank connecting rod mechanism composed of a first rotating shaft, a second rotating shaft, a B-axis rotating shaft and a swing connecting rod realizes the swing of the B-axis under the push-pull action of the B-axis mechanism. Under the action of the linear push-pull mechanism, the linear axis feed movement between a ram and a saddle is realized. Thus, the freedom of movement range of the spindle head is improved, the rigidity, torque and precision of the spindle head are enhanced, and the volume and weight of the spindle head equipment are reduced.

5 Claims, 3 Drawing Sheets

(56) References Cited

FOREIGN PATENT DOCUMENTS

| | | | | |
|---|---|---|---|---|
| CN | 104607957 | A | 5/2015 | |
| CN | 108334030 | A | 7/2018 | |
| CN | 110052882 | A | 7/2019 | |
| CN | 111590091 | A | 8/2020 | |
| ES | 2168187 | | 12/2003 | |
| GB | 2465450 | A * | 5/2010 | ............... B23Q 1/25 |

* cited by examiner

DOUBLE-SWING ANGLE SPINDLE HEAD

TECHNICAL FIELD

The present invention relates to the technical field of lathe machining, in particular to a double-swing angle spindle head.

BACKGROUND ART

In recent years, the horizontal flap five-axis machining center has been used more and more in high-end industries such as aerospace, national defense and military due to its high precision, high rigidity, high efficiency, and five-axis linkage. It is mainly used to machine high-precision parts with complex profiles, such as aerospace structural parts.

However, due to the fact that the horizontal flap five-axis machining center is currently used to machine parts with complex profiles such as aluminum alloy and titanium alloy, the removal rate is more than 90%. As shown FIG. 6, the rigidity, torque and precision of the double swing milling head of the prior art need to be improved, and in addition, its volume is too large, the dynamic performance is low, and the swing angle range cannot fully meet the machining needs.

The existing flap milling and swing head is realized by the parallel structure of three claws. In the prior art, a Sprint Z3 parallel spindle head produced by German DST company adopts a 3-bar parallel motion mechanism. The 3-bar parallel motion mechanism is composed of 3 moving devices distributed according to 120°, driven by 3 servo motors through ball screws, respectively. Driven by the ball screws, the sliding plates move along the linear guides on the base, and the movement of the sliding plates pushes the swingable rods, and then the moving platform is driven through the universal hinge, so that the main shaft on the moving platform can move in the Z-axis direction and deflect in the A-axis and B-axis directions, and the spindle head can swing within a conical range of ±40°. Although this prior art has been successfully applied to the machining of complex space curved parts, it still has defects, such as: The overall volume and weight are large, and the three branch chains have the same structure and symmetrical distribution, which leads to strong coupling in the movement of the mechanism and increases the difficulty of control.

SUMMARY OF INVENTION

The present invention provides a double-swing angle spindle head to overcome the above technical problems.

The double-swing angle spindle head according to the present invention includes, an A-axis swing shaft, a B-axis swing structure, a spindle head, a linear push-pull mechanism, a ram and a saddle, in which the B-axis swing structure includes, a B-axis rotating shaft, a first rotating shaft, a second rotating shaft, a swing connecting rod, a B-axis push-pull mechanism, and a box; in which the B-axis push-pull mechanism includes, a B-axis push-pull slide plate and a B-axis drive structure; the B-axis push-pull slide plate is arranged above the ram, one end of the B-axis push-pull slide plate is movably connected with one end of the swing connecting rod through the first rotating shaft, the other end of the swing connecting rod is movably connected to the box through the second rotating shaft, and the B-axis drive structure drives the B-axis push-pull slide plate to move linearly along the ram; the spindle head is located in the box, the spindle head axis intersects perpendicularly the B-axis rotating shaft axis; the box is movably connected with the front end of the ram through the B-axis rotating shaft; the A-axis swing shaft is connected with the spindle head through a flange; the A-axis swing shaft axis and B-axis rotating shaft axis are coplanar; the saddle is arranged below the ram, and the linear push-pull mechanism is arranged on the saddle; the linear push-pull mechanism drives the ram to move linearly on the saddle.

Further, one end of the B-axis push-pull slide plate is hinged with one end of the swing connecting rod through the first rotating shaft; the other end of the swing connecting rod is hinged with the box through the second rotating shaft; and the box is hinged with the front end of the ram through the B-axis rotating shaft.

Further, the first rotating shaft axis is arranged between the B-axis rotating shaft and the second rotating shaft, and when the box achieves the limit range of −35° to +35° around the B-axis rotating shaft, the angle of the smallest interior angle of the triangle formed by the axes of the B-axis rotating shaft, the first rotating shaft and the second rotating shaft is not less than 30°.

Further, the spindle head can rotate within an included angle range of −45° to +45° with respect to the A-axis swing shaft axis, and the spindle head can rotate about B-axis rotating shaft within an included angle range of −35° to +35°.

Further, the B-axis push-pull mechanism, the linear push-pull mechanism, the A-axis swing shaft are all connected with a drive motor which is a servo motor.

Further, the saddle moves up and down.

In the present invention, the A-axis swing shaft is connected with the spindle head through the flange, so that the spindle head swings in the X-axis direction; through the combination of the first rotating shaft, the second rotating shaft, the B-axis rotating shaft, the swing connecting rod and the box, and under the push-pull action of the B-axis push-pull mechanism, the spindle head can swing in the Y-axis direction; under the action of the linear push-pull mechanism, the linear feed movement is realized between the ram and the saddle, and the spindle head can extend and retract in the Z-axis direction, so that the freedom range of the spindle head is expanded, the rigidity, torque and precision of the spindle head are enhanced, and the volume and weight of the spindle head equipment are reduced.

BRIEF DESCRIPTION OF DRAWINGS

In order to illustrate the embodiments of the present invention or the technical solutions in the prior art more clearly, the following briefly introduces the accompanying drawings that need to be used in the description of the embodiments or the prior art. Obviously, the accompanying drawings in the following description are some embodiments of the present invention, and for a person skilled in the art, other drawings can also be obtained from these accompanying drawings without creative effort.

REFERENCE SIGNS LIST

Figure 1:
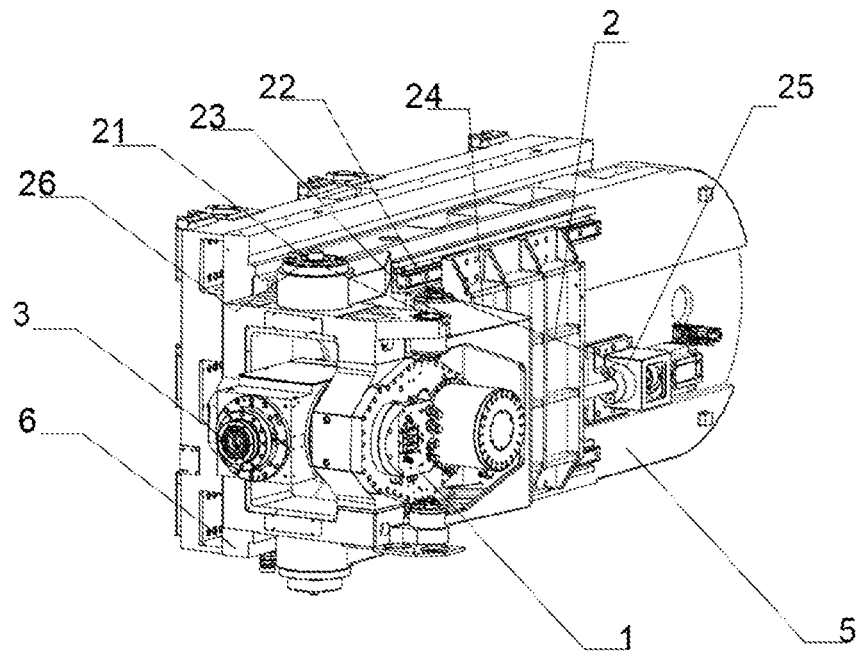
FIG. 1 is a schematic diagram of the overall structure of the double-swing angle spindle head according to the present invention.

1 A-axis swing shaft
2 B-axis swing structure
3 spindle head
4 linear push-pull mechanism
5 ram
6 saddle
7 slide rail connection structure
8 screw connection structure
21 B-axis rotating shaft
22 first rotating shaft
23 second rotating shaft
24 swing connecting rod
25 B-axis push-pull mechanism
26 box
251 B-axis push-pull slide plate
252 B-axis drive structure

DESCRIPTION OF EMBODIMENTS

In order to make the purposes, technical solutions and advantages of the embodiments of the present invention clearer, the technical solutions in the embodiments of the present invention will be clearly and completely described below with reference to the accompanying drawings in the embodiments of the present invention. Obviously, the embodiments to be described are some, but not all, embodiments of the present invention. All other embodiments obtained by persons of ordinary skill in the art based on the embodiments of the present invention without creative efforts shall fall within the protection scope of the present invention.

The double-swing angle spindle head according to the present invention includes, an A-axis swing shaft 1, a B-axis swing structure 2, a spindle head 3, a linear push-pull mechanism 4, a ram 5 and a saddle 6, in which the B-axis swing structure 2 includes, a B-axis rotating shaft 21, a first rotating shaft 22, a second rotating shaft 23, a swing connecting rod 24, a B-axis push-pull mechanism 25, a box 26, in which the B-axis push-pull mechanism 25 includes, a B-axis push-pull slide plate 251 and a B-axis drive structure 252; in which the B-axis push-pull slide plate 251 is arranged above the ram 5, one end of the B-axis push-pull slide plate 251 is movably connected to one end of the swing connecting rod 24 through the first rotating shaft 22, the other end of the swing connecting rod 24 is movably connected to the box 26 through the second rotating shaft 23, the B-axis drive structure 252 drives the B-axis push-pull slide plate 251 to move linearly along the ram 5; the spindle head 3 is located in the box 26, the spindle head 3 axis intersects perpendicularly with the B-axis rotating shaft 21 axis; the box 26 is movably connected with the front end of the ram 5 through the B-axis rotating shaft 21; the A-axis swing shaft 1 is connected with the spindle head 3 through a flange; the A-axis swing shaft 1 axis and the B-axis rotating shaft 21 axis are coplanar; the saddle 6 is arranged below the ram 5, and the linear push-pull mechanism 4 is arranged on the saddle 6; the linear push-pull mechanism 4 drives the ram 5 to move linearly on the saddle 6.

Specifically, as shown in FIG. 1, the B-axis rotating shaft 21 is arranged in the horizontal direction of the device, the B-axis rotating shaft 21, the first rotating shaft 22, the second rotating shaft 23, the swing connecting rod 24, the B-axis push-pull mechanism 25, the box 26 constitute the B-axis swing structure 2, in which the B-axis push-pull mechanism 25 is composed of the B-axis push-pull slide plate 251 and the B-axis drive structure 252, the first rotating shaft 22, the second rotating shaft 23, the B-axis rotating shaft 21 and the swing connecting rod 24 together constitute a crank connecting rod mechanism, the box 26 is movably connected with the ram 5 through the B-axis rotating shaft 21, the B-axis push-pull slide plate 251 is arranged on the B-axis drive structure 252, the B-axis push-pull slide plate 251 can move linearly along the ram 5 under the driving action of the B-axis drive structure 252, so that the first rotating shaft 22, the second rotating shaft 23, and the B-axis rotating shaft 21 are driven to rotate at the same time, thereby driving the box and the spindle head 3 disposed inside to swing up and down. In the process of realizing the rotation of the B-axis, it is necessary to control the trajectory to maintain symmetry to avoid the increase of the shaft stroke of the ram 5 caused by the eccentricity of the spindle head and the B-axis rotating shaft 21, which may further increase the ram overhang, resulting in a reduction in overall stiffness.

As shown in FIG. 1, the A-axis swing shaft 1 is arranged in the longitudinal direction of the device. The A-axis swing shaft 1 is connected to the spindle head 3 through a flange, and the rotation of the A-axis swing shaft 1 drives the spindle head 3 to swing left and right.

Figure 3:
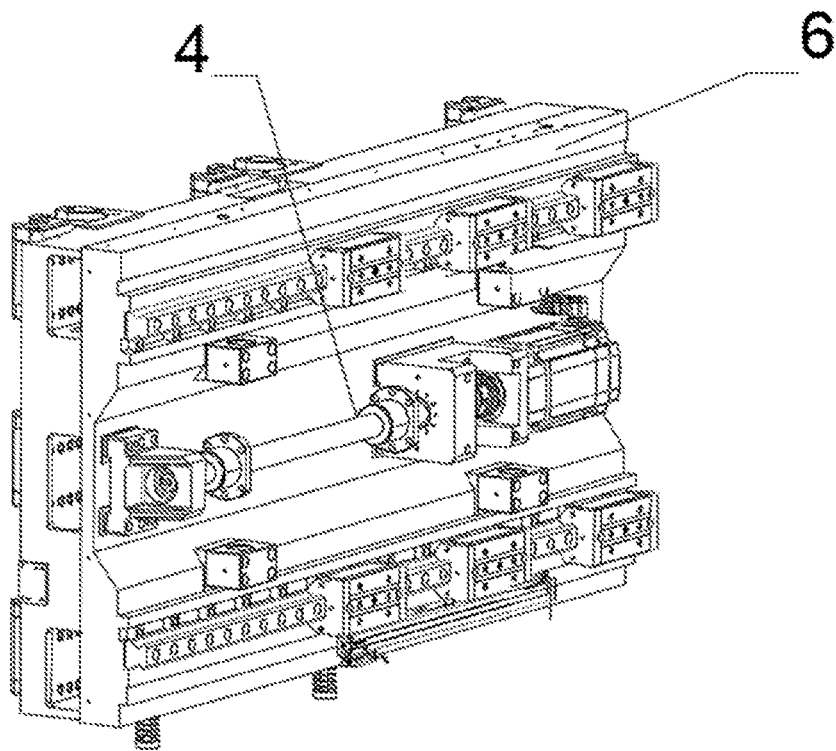
FIG. 3 is a schematic diagram of the saddle according to the present invention.

As shown in FIG. 3, under the action of the linear push-pull mechanism 4, the ram 5 makes linear feed movement along the saddle 6.

Figure 4:
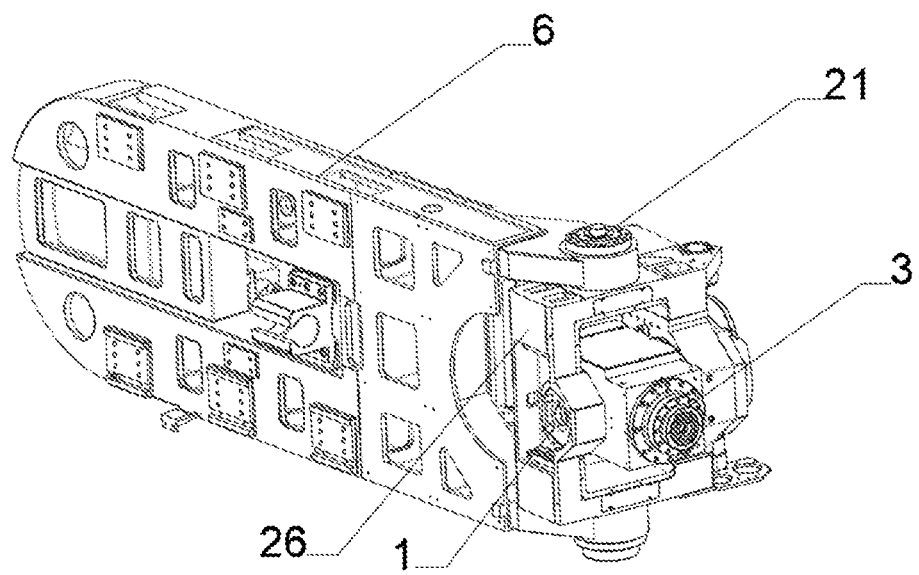
FIG. 4 is a schematic diagram of the coplanar state of the A-axis swing shaft axis and B-axis rotating shaft axis according to the present invention.

As shown in FIG. 4, in this embodiment, the spindle head 3 axis and the B-axis rotating shaft 21 axis are perpendicularly intersected, otherwise the B-axis rotating shaft 21 drives the spindle head 3 to swing asymmetrically, causing the side with the smaller angle rotates faster, and the side with the larger angle rotates slower. To achieve the same machining parameters on both sides, the ram needs to be extended and retracted along the Z-axis. The arrangement of this embodiment can ensure that the B-axis rotating shaft 21 drives the spindle head 3 to swing in a symmetrical structure and rotates at a uniform speed, thus ensuring that when the spindle head 3 rotates, the extension and retraction amount of the ram along the Z axis is always the same, thereby improving the rationality of the layout of the whole machine, enhancing the rigidity and precision of the spindle head 3, and saving space.

Further, one end of the B-axis push-pull slide plate 251 is hinged with one end of the swing connecting rod 24 through the first rotating shaft 22; the other end of the swing connecting rod 24 is hinged with the box 26 through the second rotating shaft 23; and the box 26 is hinged with the front end of the ram 5 through the B-axis rotating shaft 21.

Figure 2:
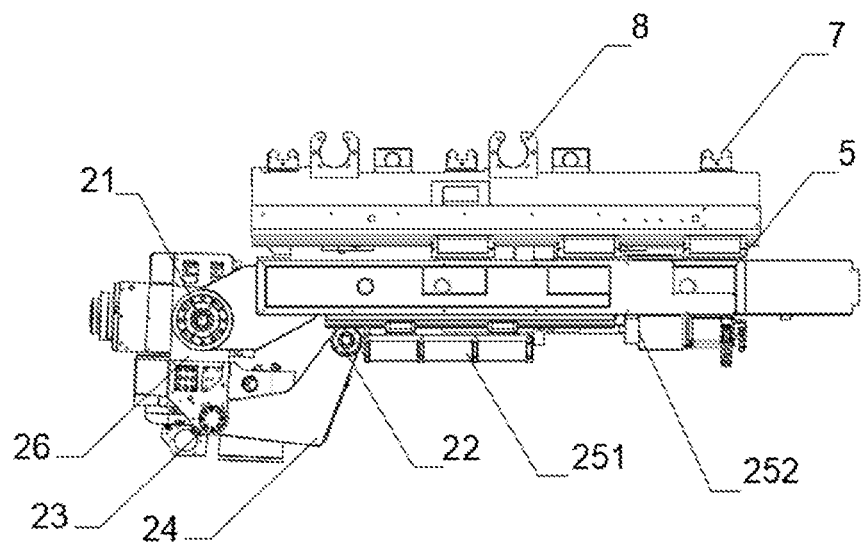
FIG. 2 is a side view of the double swing angle spindle head according to the present invention.

Specifically, as shown in FIG. 2, the crank connecting rod mechanism composed of the first rotating shaft 22, the second rotating shaft 23, the B-axis rotating shaft 21 and the swing connecting rod 24 adopts a hinged structure, which can effectively resist shear force and axial force, so that the swing connecting rod 24 is not easily deformed, and the bearing wear is reduced, thereby improving the service life of the B-axis swing structure 2.

Further, the first rotating shaft 22 axis is arranged between the B-axis rotating shaft 21 and the second rotating shaft 23, and when the box 6 achieves the limit range of −35° to +35° around the B-axis rotating shaft 21, the angle of the smallest interior angle of the triangle formed by the axes of the B-axis rotating shaft 21, the first rotating shaft 22 and the second rotating shaft 23 is not less than 30°.

Figure 5:
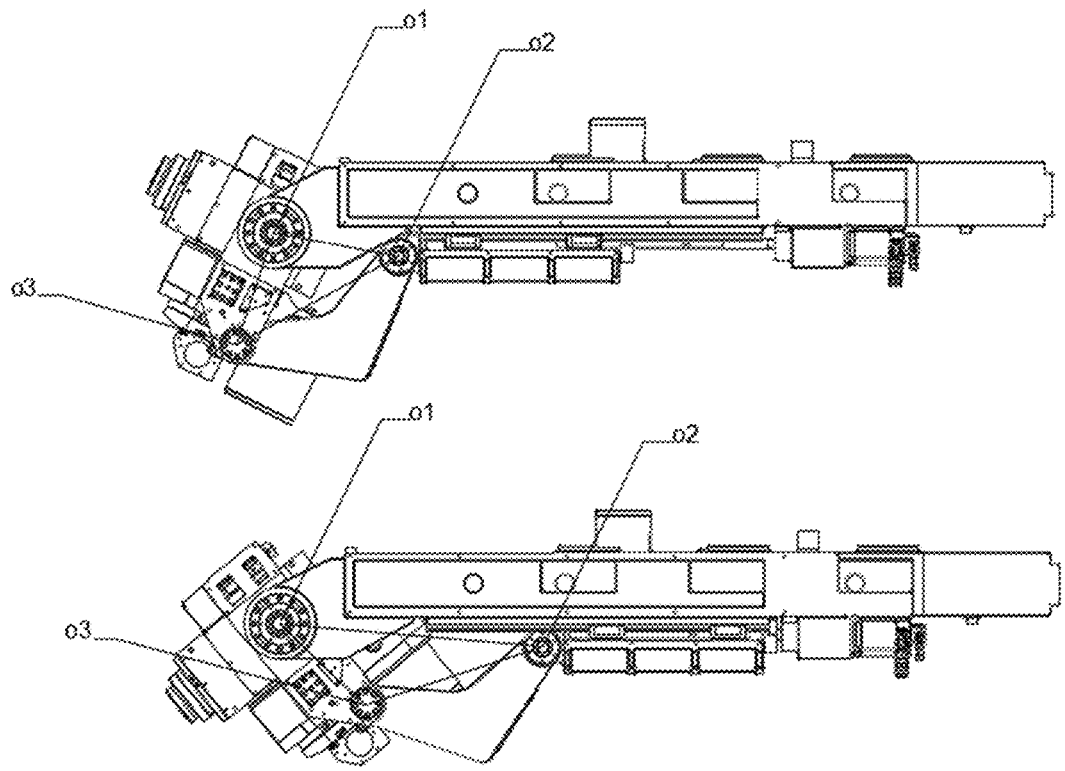
FIG. 5 a schematic diagram of the present invention, in which the box achieves the limit range of −35° to +35° around the B-axis rotating shaft.
Figure 6:
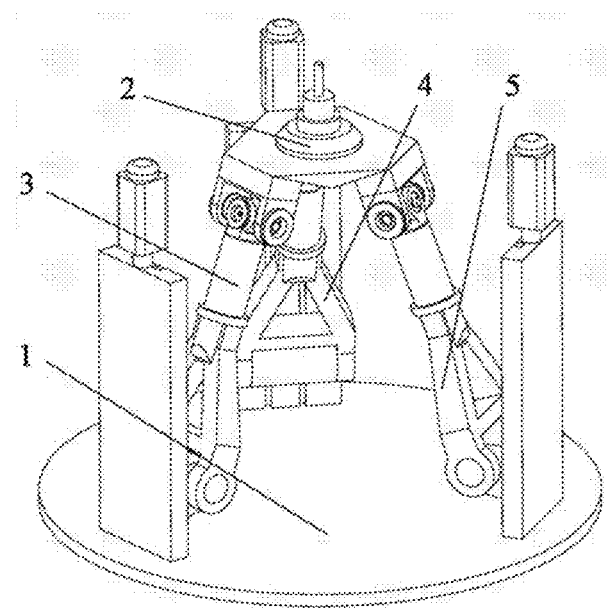
FIG. 6 is a schematic diagram of the structure of a double swing milling head according to the prior art.

Specifically, as shown in FIG. 5, the moving distance of the B-axis push-pull slide plate 251 is between 300 mm-350 mm, in which the box 6 achieves the limit range of −35° to +35° around the B-axis rotating shaft. The axes of the B-axis rotating shaft 21, the first rotating shaft 22, and the second rotating shaft 23 can form three vertices of a triangle, and the smallest acute angle in the triangle is not less than 30 degrees. The second rotating shaft 23 is projected on the vertical direction of the push-pull direction of the B-axis drive structure 252. The distance A from the $O_2$ hinge point to the $O_1$ hinge point is constant. The larger the value of A, the better if the structure space allows. The distance from the $O_3$ hinge point to the $O_2$ hinge point is variable during the rotation of the B-axis, and the distances between the two extreme positions are variable B and variable C, respectively. Regardless of the limit position or the intermediate machining position, the three points $O_1$, $O_2$, and $O_3$ form a triangle. On the projection in the vertical direction of the push-pull direction of the B-axis drive structure 252, $O_2$ must be placed between $O_1$ and $O_3$ to avoid collinearity. In this embodiment, the angle of the minimum interior angle of the triangle is not less than 30 degrees, thereby constraining the equivalent lengths of the connecting rods of several mechanical structures and controlling them within a reasonable range.

Further, the spindle head 3 can rotate within an included angle range of −45° to +45° with respect to the A-axis swing shaft 1 axis, and the spindle head 3 can rotate about the B-axis rotating shaft 21 within an included angle range of −35° to +35°.

Specifically, the swing angle range of typical AB-axes milling heads in the industry is mostly within −30° to +30°, which cannot fully meet the machining needs. As shown in FIG. 1, a spindle head box for fixing can be set outside the spindle head 3, the A-axis swing shaft 1 and the B-axis rotating shaft are respectively connected with the spindle head box, the spindle head box and the box 26 are axially connected along the A-axis swing shaft 1, and reasonable setting of the opening width of the box 26 for mounting the spindle head box can limit the swing amplitude of the spindle head driven by the A-axis swing shaft 1 relative to the A-axis swing shaft 1 axis, so that the swing of the A-axis is within the range of −45°~+45°; the angle that the B-axis rotating shaft 21 drives the spindle head 3 to swing is determined by the crank connecting rod mechanism composed of the first rotating shaft 22, the second rotating shaft 23, the B-axis rotating shaft 21 and the swing connecting rod 24, and when the B-axis push-pull mechanism 25 drives the crank connecting rod mechanism to move in a straight line, the moving distance of the B-axis push-pull slide plate 251 is between 300 mm-350 mm, in which the B-axis swing box can rotate about the B-axis rotating shaft within the angle range of −35°~+35°. This design saves space while expanding the range of milling operations.

Further, the B-axis push-pull mechanism 25, the linear push-pull mechanism 4, and the A-axis swing shaft 1 are all connected with a drive motor which is a servo motor.

Specifically, as shown in FIG. 1, FIG. 3, the B-axis push-pull mechanism 25, the linear push-pull mechanism 4, and the A-axis swing shaft 1 are all driven and controlled by the servo motor, and the servo motor is connected to the B-axis push-pull mechanism 25 and the precision ball screw on the linear push-pull mechanism 4 through the bearing coupling to transmit the axial torque, so that the B-axis push-pull mechanism 25 and the linear push-pull mechanism 4 transmit the thrust of the linear movement. The servo motor can achieve closed-loop control of position, speed and torque in terms of accuracy, with the speed of 2000 to 3000 rpm, and at the same time, it has the advantages of strong anti-overload capability, stable operation at low speed, short dynamic response time of acceleration and deceleration, low heat generation and noise, etc., which is suitable for the application requirements of the invention.

As shown in FIG. 2, the saddle 6 is provided with a slide rail connection structure 7 and a screw connection structure 8 relative to the end face connecting the linear push-pull mechanism 4, which can be used to connect the linear push-pull mechanism 4, and connect the power device to realize up and down movement, so as to maximize the scope and function of the spindle head.

Finally, it should be noted that: the above embodiments are only used to illustrate the technical solutions of the present invention, but not to limit them. Although the present invention has been described in detail with reference to the foregoing embodiments, a person skilled in the art should understand that: the technical solutions described in the foregoing embodiments can still be modified, or some or all of the technical features thereof can be equivalently substituted. However, these modifications or substitutions do not make the essence of the corresponding technical solutions deviate from the scope of the technical solutions of the embodiments of the present invention.

The invention claimed is:

1. A double-swing angle spindle head, comprising,
an A-axis swing shaft, a B-axis swing structure, a spindle head, a linear push-pull mechanism, a ram and a saddle, wherein
the B-axis swing structure has a B-axis rotating shaft, a first rotating shaft, a second rotating shaft, a swing connecting rod, a B-axis push-pull mechanism, and a box,
the B-axis push-pull mechanism has a B-axis push-pull slide plate and a B-axis drive structure, wherein
the B-axis push-pull slide plate is arranged above the ram, one end of the B-axis push-pull slide plate is movably connected with one end of the swing connecting rod through the first rotating shaft, the other end of the swing connecting rod is movably connected to the box through the second rotating shaft, and the B-axis drive structure drives the B-axis push-pull slide plate to move linearly along the ram,
the spindle head is located in the box, the spindle head axis intersects perpendicularly with the B-axis rotating shaft axis; the box is movably connected with the front end of the ram through the B-axis rotating shaft,
the A-axis swing shaft is connected with the spindle head through a flange; the A-axis swing shaft axis and the B-axis rotating shaft axis are coplanar,
the saddle is arranged below the ram, the linear push-pull mechanism is arranged on the saddle; the linear push-pull mechanism drives the ram to move linearly on the saddle;
wherein the first rotating shaft axis is arranged between the B-axis rotating shaft and the second rotating shaft, when the box achieves the limit range of −35° to +35° around the B-axis rotating shaft, the angle of the smallest interior angle of the triangle formed by the axes of the B-axis rotating shaft, the first rotating shaft and the second rotating shaft is not less than 30°.

2. The double-swing angle spindle head according to claim 1, wherein one end of the B-axis push-pull slide plate is hinged with one end of the swing connecting rod through the first rotating shaft; the other end of the swing connecting rod is hinged with the box through the second rotating shaft; and the box is hinged with the front end of the ram through the B-axis rotating shaft.

3. The double-swing angle spindle head according to claim 1, wherein the spindle head can rotate within an included angle range of −45° to +45° with respect to the A-axis swing shaft axis, and the spindle head can rotate about B-axis rotating shaft within an included angle range of −35° to +35°.

4. The double-swing angle spindle head according to claim 1, wherein the B-axis push-pull mechanism, the linear push-pull mechanism, and the A-axis swing shaft are all driven by a servo motor.

5. The double swing angle spindle head according to claim 1, wherein the saddle moves up and down.

\* \* \* \* \*